Oct. 22, 1963  L. J. LOVERING  3,107,440
AUDIOMETRY EQUIPMENT
Filed Dec. 20, 1960  4 Sheets—Sheet 1

Larry J. Lovering
INVENTOR.
BY

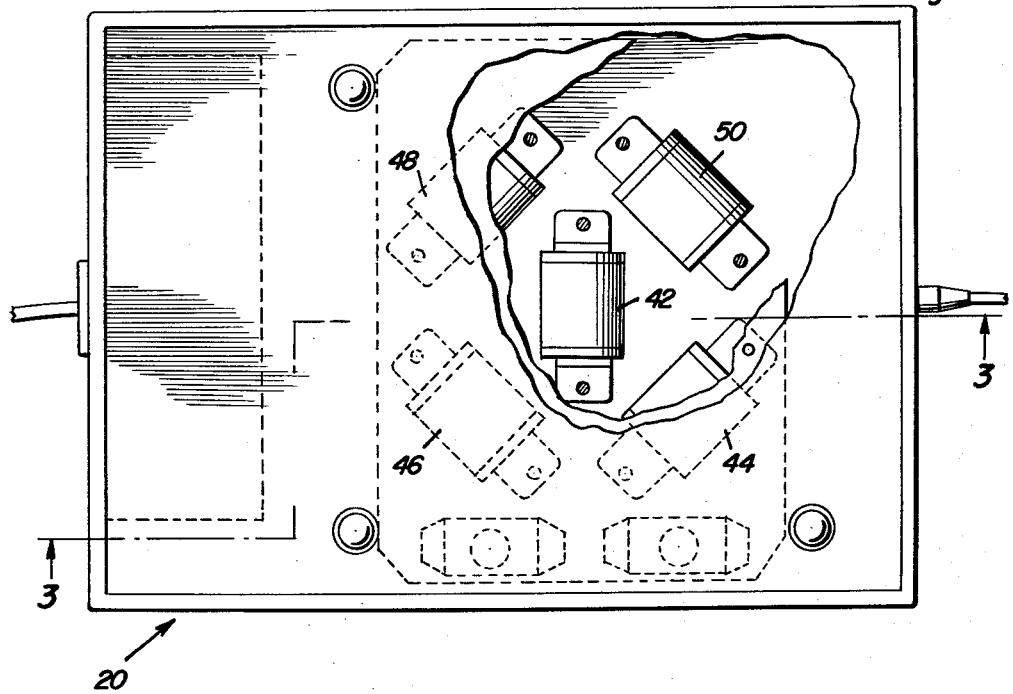
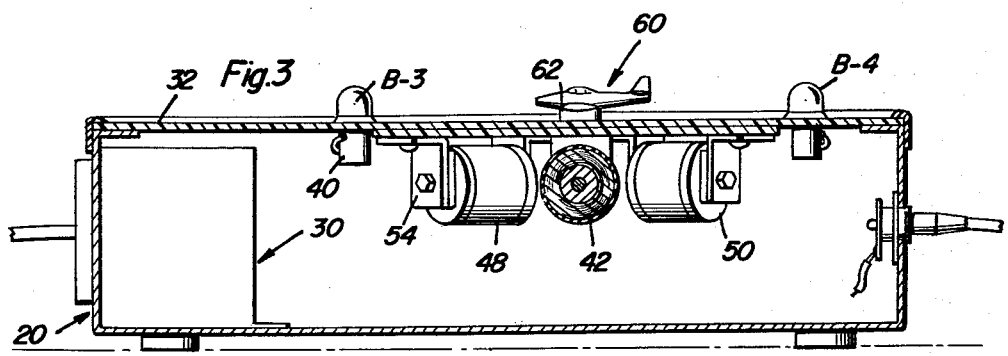
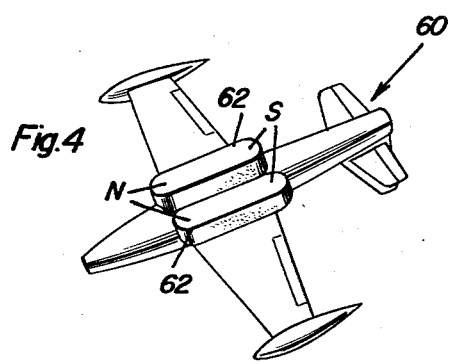

Oct. 22, 1963   L. J. LOVERING   3,107,440
AUDIOMETRY EQUIPMENT
Filed Dec. 20, 1960   4 Sheets-Sheet 3

Larry J. Lovering
INVENTOR.

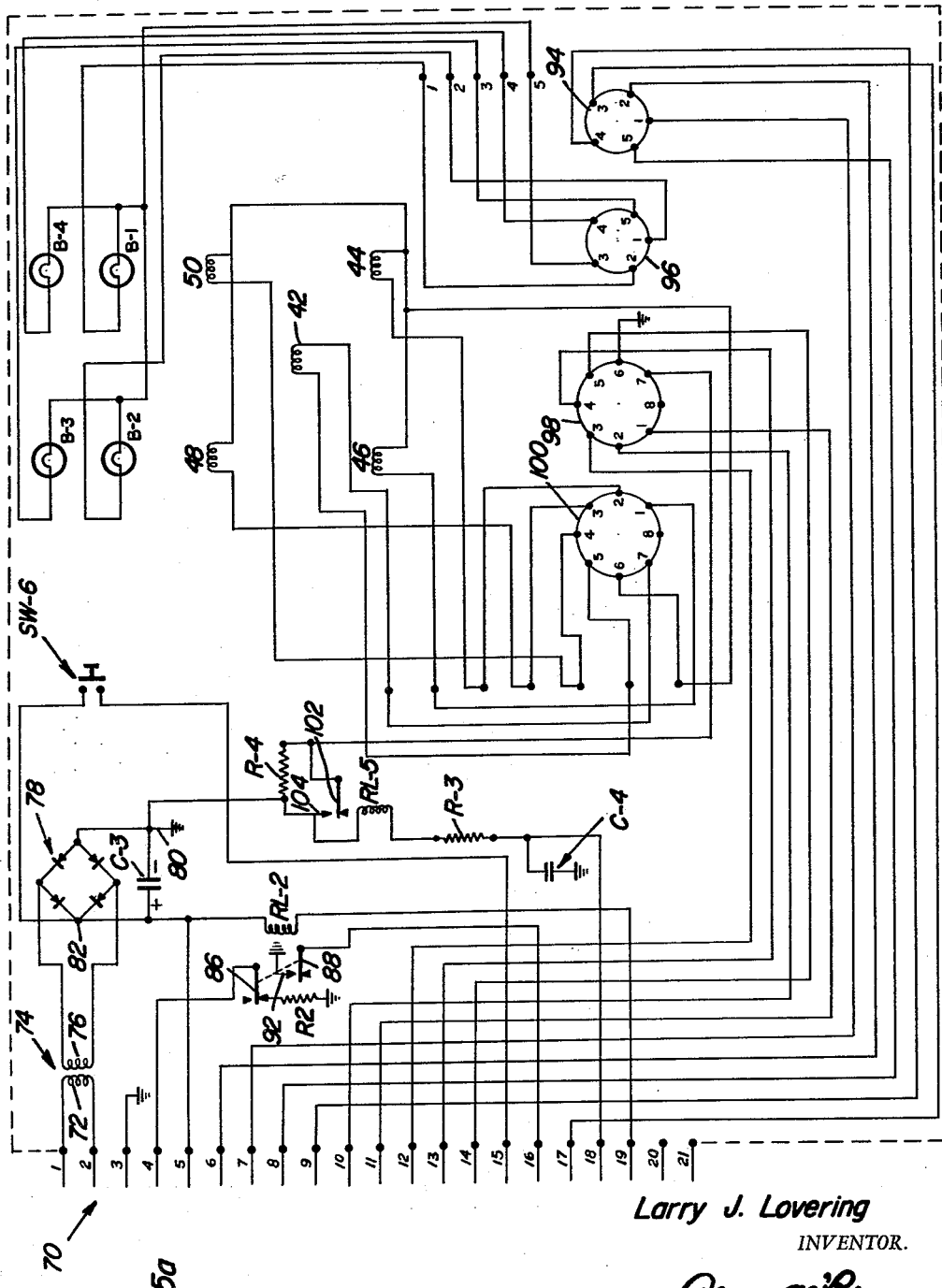

– – – –

3,107,440
AUDIOMETRY EQUIPMENT
Larry J. Lovering, Las Vegas, Nev.
(Box 9, Silver Gate, Mont.)
Filed Dec. 20, 1960, Ser. No. 77,132
16 Claims. (Cl. 35—22)

This invention relates generally to audiometry equipment and more particularly to means for motivating children during the evaluation of a child's hearing ability.

The early evaluation of the hearing of young children is extremely important. The accurate evaluation of a young child's hearing is, at best, difficult to obtain. Various attempts have been made by audiologists and others who test hearing to motivate children to listen for the test stimulus. Some of the attempts have included the use of blocks or marbles. More particularly, if the child hears the test stimulus, he is permitted to overturn a pile of blocks or perhaps drop a marble on the floor. Such attempts at motivation lack the control by the tester that is necessary in this type of testing. In the case of the marbles or blocks, the tester has no control over the reward. There is little the tester can do to prevent the child from dropping the marble or marbles on the floor whenever the child wishes. Therefore, the child gains a reward without hearing the test stimulus. While testing young children employing the various conventional methods of pure tone audiometry, the need to motivate the children during the test became apparent.

In view of the above, it is the principal object of this invention to provide in conjunction with audiometry equipment or for that matter any test equipment, means for motivating children under test stimulus.

It is a more particular object of this invention to provide improved means for gaining and retaining the interest and attention of children throughout tests. Experience has indicated that the device herein not only gains and retains the children's attention, but also makes the children eager and willing to be tested since they effectively receive a reward when properly responding to a test stimulus yet discourages the seeking of said reward by removal of the motivation during periods of no stimulus.

It is a still further object of the invention to provide in conjunction with test equipment for children, novel means for motivating them during the test so as to assure an accurate evaluation.

It is a still further object of this invention to provide motivating means for children undergoing tests; said motivating means being relatively simple in construction and operation and accordingly relatively inexpensive to purchase and maintain.

These together with other objects and advantages which will become subsequently apparent reside in the details of construction and operation as more fully hereinafter described and claimed, reference being made to the accompanying drawings forming a part hereof, wherein like numerals refer to like parts throughout, and in which:

FIGURE 2 is a top plan view partially broken away of the slave unit;

FIGURE 3 is a vertical sectional view taken substantially along the plane 3—3 of FIGURE 2;

FIGURE 4 is a perspective view of one of several toys mounted on permanent type magnets which may be employed in conjunction with the slave unit; and FIGURES 5 and 5a are portions of the circuitry employed in the control unit and slave unit.

Figure 1:
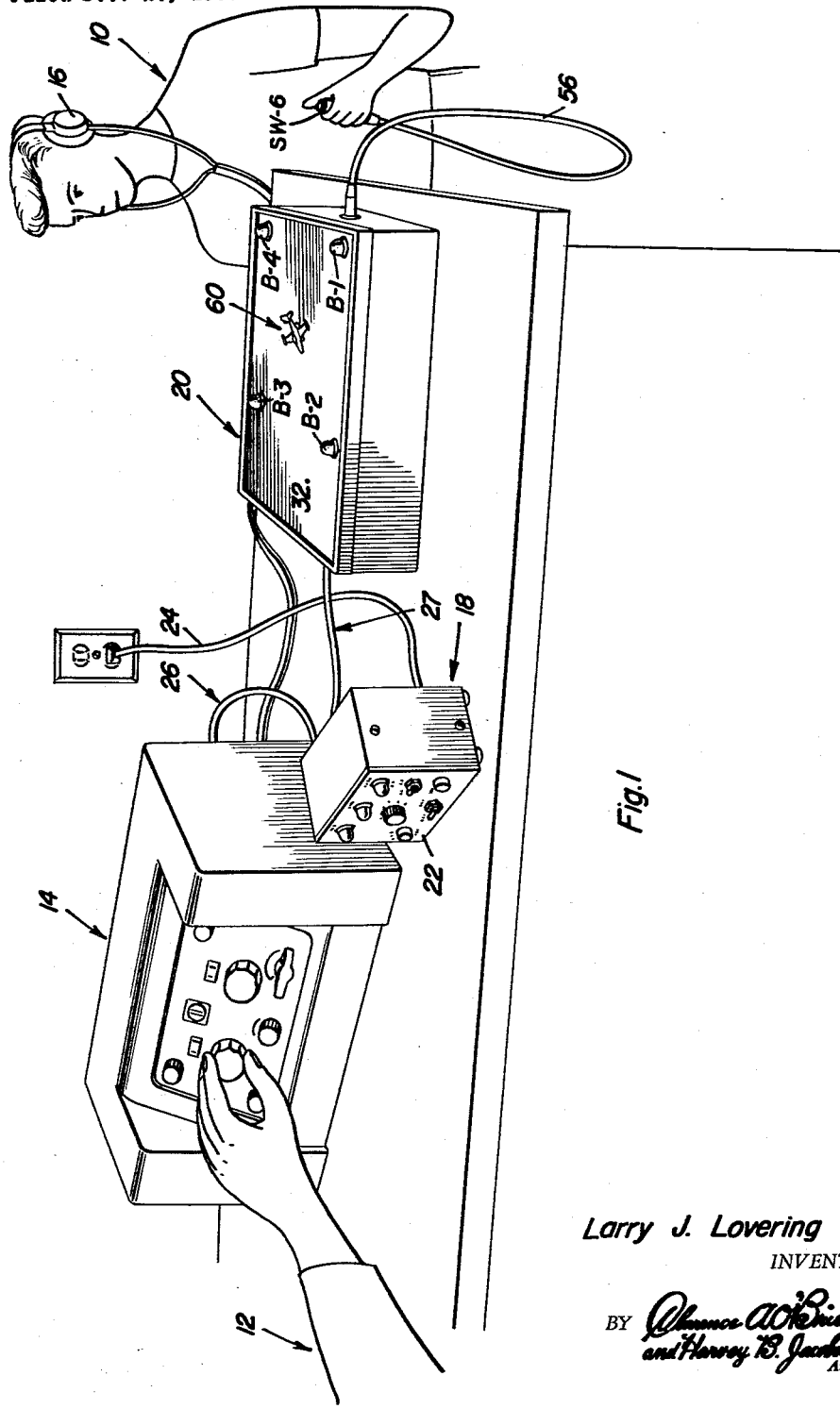
FIGURE 1 is a perspective view of a test set-up showing the tester on the left operating a conventional pure tone audiometer, a control unit in the center, a slave unit on the right, and a child under test on the far right.

With continuing reference to the drawings, initial attention is called to FIGURE 1 wherein the hearing ability of a child 10 is being evaluated by a tester 12. For this purpose, a pure tone audiometer 14, which is a conventional instrument, is connected through earphones 16 worn by the child 10. It is desired that the child 10 respond to a pure tone stimulus emitted by the audiometer 14. In order to motivate the child 10 during the test so as to assure that his complete attention is given to the tester and the tone, the invention herein is employed which includes a control unit 18 and a motivation producing slave unit 20. The control unit 18 includes a control panel 22 which is visible to the tester 12 but which is not visible to the child 10. An electric cord 24 is employed to energize the control unit 18 and slave unit 20. Cables 26 and 27 interconnect the audiometer 14, control unit 18 and slave unit 20.

Calling attention now particularly to FIGURES 2 through 4, it is to be noted that the slave unit 20 includes a substantially rectangular box construction within which the power supply 30 is located. The slave unit 20 defines an open top which is covered by a sheet of formica 32. Bulbs B–1, B–2, B–3 and B–4 project through a sheet of formica and are received for energization in conventional sockets 40 carried beneath the sheet. The bulbs are arranged in a rectilinear manner so as to substantially define a rectangle. Five electromagnets are supported in the slave unit box below the formica sheet 32 on a side thereof opposite to the bulbs. A centrally disposed electromagnet is designated by the numeral 42 while the four electromagnets surrounding the centrally disposed magnet 42, each being positioned adjacent to a bulb, are designated by the numerals 44, 46, 48 and 50. It will be appreciated that any means may be employed to support the electromagnets from the sheet 32 with the drawings just showing a typical means of mounting including angle brackets 54.

Extending from the slave unit 20 is a cable 56 terminating in a normally open hand switch SW–6 held by the child 10. In use, the child is told that he is to close the switch SW–6 by depressing a button when he hears a tone. The function of the switch and specific manner in which it is connected with the electrical circuitry will be brought out more clearly hereafter.

Toys 60 in the shape of airplanes or such have a pair of small permanent magnets 62 glued to the bottom surface thereof (FIGURE 4). The toys are preferably of plastic and may be colorful to better hold the interest of the child 10 and hence constitutes a motivating object. The broad intent of the apparatus described to this point is to provide means for motivating the child 10 so the tester 12 can accurately evaluate his response to a stimulus created by the audiometer 14. In order to motivate the child, one of the toys 60 is placed near the center of the formica sheet 32. The child is instructed verbally or by pantomime to depress a button on the hand held motivated reaction switch SW-6 when he hears a tone. If the tone has been emitted and the child indicates that he hears the tone stimulus by closing the switch SW-6, the toy 60 will move immediately from the center of the slave unit to any one of the four corners of the formica sheet which has been selected by the tester 12 through proper utilization of the control unit 18 which movement will constitute a motivation for the child for depressing the switch SW-6 in response to the stimulus. If a tone presentation is halted by the tester, or if the switch SW-6 is opened by the child, the toy 60 will move automatically back to the center position from any one of the four corners. If the child 10 closes the switch SW-6 without the tone presentation, nothing happens to reward him. The toy does not move. Means are provided on the control panel 22, however, in the form of an indicator light, to advise the tester that the child has sought a reward or depressed SW-6 between stimulus or tone presentations.

Figure 5:
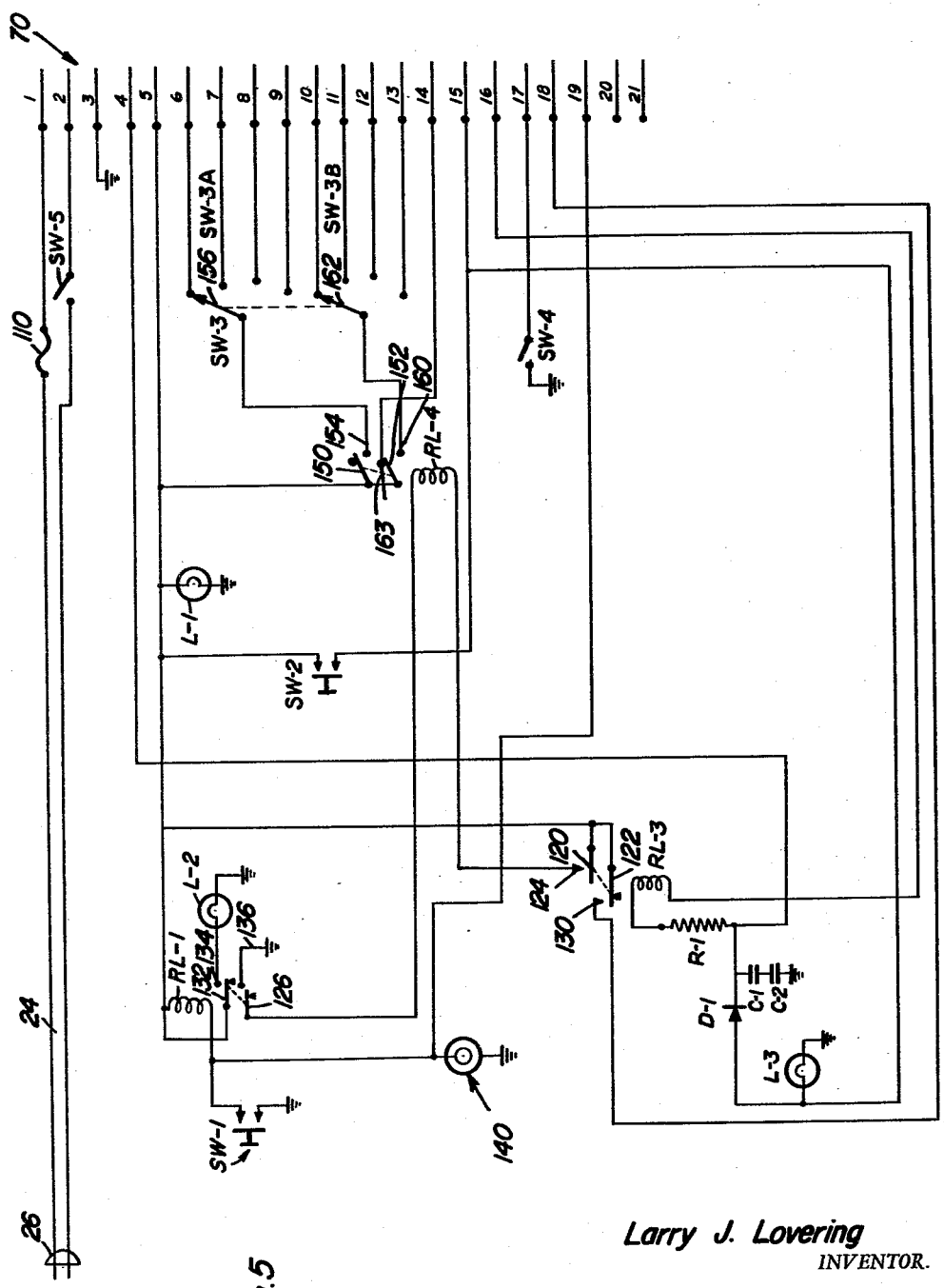

Attention is now drawn to FIGURES 5 and 5a. FIGURE 5a shows the internal wiring of the slave unit 20 while FIGURE 5 shows the wiring in the control unit 18. For purposes of clarity, a terminal board 70 having 21 terminals is shown in each of the figures. By so depicting the connections, the interconnections between the slave unit and control unit will be more apparent. Also, of course, it is most practical in a true installation to employ some type of terminal board arrangement.

Connected between terminals 1 and 2 is a primary winding 72 of a transformer 74. The secondary winding 76 is connected across a rectifier network 78 which is grounded at 80 to form an operating power supply. Switch SW-6 is interposed between power output point 82 and terminal 15. Connected between point 82 and terminal 19 is a motivation removal relay coil RL-2. A capacitor C-3 is connected between ground at 80 and one side of the relay coil RL-2 which in turn is connected to the terminal 5. Terminal 3 is grounded.

Terminal 4 is connected to movable circuit clearing reset contact 86 which is in gang relationship with movable stimulus operating contact 88, both being responsive to the energization of coil RL-2. The contact 86 is normally connected through the resistor R-2 to ground, the movable contact 88 which extends to terminal 16 is connected to ground through contact 92 upon the energization of coil RL-2. Terminals 6 through 9 and terminal 17 are connected to a plug 94 cooperable with a socket 96, the plug 94 and socket 96 being utilized to properly connect the bulbs destination indicating B-1, B-2, B-3 and B-4 for energization. Terminals 10 through 14 are connected to plug 98 cooperable with socket 100 for properly connecting the motivation operating and resetting electromagnetic coils 42, 44, 46, 48 and 50 for energization. A power reducing relay coil RL-5 is connected between ground at 80 and resistor R-3 to terminal 18. When RL-5 is energized movable voltage controlling contact 102 moves into engagement with stationary contact 104 to short out resistor R-4 connected between ground at 80 and pin 7 on plug 98.

Attention is now called to FIGURE 5 wherein the circuitry of the control unit is shown. Cord 24 has plug 26 on the end thereof adapted to apply through switch SW-5, a conventional 110-120 volts of 60 cycle A.C. across terminals 1 and 2. A fuse 110 is provided. Terminal 3 is grounded. Terminal 4 is connected through resistor R-1 and deenergizing delay relay coil RL-3 to terminal 16. A diode D-1 is connected between terminal 4 and terminal 15. Reaction indicator lamp L-3 is connected between terminal 15 and ground. Storage capacitors C-1 and C-2 are connected between terminal 4 and ground. A pair of ganged contacts 120 and 122 are shown in their normal position when coil RL-3 is deenergized. When RL-3 is energized, movable contact 120 moves into engagement with fixed contact 124 connected serially through motivation operating control relay coil RL-4 to movable contact 126 responsive to stimulus responsive relay coil RL-1. Movable contact 122 upon energization of coil RL-3 moves into contact with contact 130 connected to terminal 18. Movable stimulus indicator control contact 132 is responsive to the energization of relay coil RL-1 and upon energization engages stationary contact 134 serially connected with stimulus indicator lamp L-2 to ground. Contact 126 on the energization of coil RL-1 moves to ground at 136. A normally open stimulus over-control switch SW-1 connects one side of coil RL-1 to ground when closed, the other side of coil RL-1 being connected to terminal 5. A socket 140 into which a lead from the stimulus source or audiometer is adapted to be plugged, is connected in parallel with switch SW-1. Connected to the same side of coil RL-1 as the switch SW-1 is terminal 19. Extending between terminals 5 and 15 is a normally open reaction over-control switch SW-2. Power supply indicator lamp L-1 is connected between terminal 5 and ground. Disabling switch SW-4 for the destination indicators is connected between terminal 17 and ground. Relay coil RL-4 controls movable motivation controlling contacts 150 and 152. Upon energization movable contact 150 moves into engagement with contact 154 connected to destination selector wiper 156 engageable with terminals 6 through 9. Also upon energization of RL-4, movable contact 152 engages contact 160 connected to motivation operating selector wiper 162 engageable with terminals 10 through 13. Normally, movable contact 152 is engaged with stationary contact 163 which is connected to terminal 14.

The function of several of the components will now be discussed with a summary of the over-all operation being given subsequently. Switch SW-1 is a push button type of over-control switch located on the control panel. When depressed, it establishes a grounded circuit through both the coils of relays RL-1 and RL-2 from the output of rectifier 78. Thus, current flow causes the stimulus responsive relay coil RL-1 to become activated. Switch SW-1 is connected in parallel with the tone interrupter switch located on the audiometer 14 or stimulus source by means of a coaxial cable whose plug inserts into the socket 140. Depressing the tone interrupter switch (conventional) on the audiometer, therefore, presents the audio test stimulus to the earphones simultaneously as coil stimulus responsive relay RL-1 is energized. Such an arrangement is desirable so as to eliminate the need for the tester to have to operate two switches at once (SW-1 and the tone interrupter switch on the audiometer). However, the need for SW-1 in addition to the method of control from the audiometer is of further importance in the operation of the slave unit 20.

Swithch SW-2 is a push button type of over-control switch located on the control panel and is connected in parallel with switch SW-6. SW-2 is a part of a dual or over-control system which permits the tester to perform the same function at the control panel as is performed by the closure of switch SW-6. Switch SW-2 may be operated simultaneously with SW-1 in instances where the tester wishes to operate the toy without presenting the tone and without having the child 10 depress SW-6. If coil RL-1 is energized, depressing either SW-2 or SW-6 will cause one of the four corner electromagnets to become energized, and one of the bulbs adjacent to the particular electromagnet to be flashed. If coil RL-1 is not energized, and no tone is presented to the earphones, depressing either SW-2 or SW-6 will not energize any of the electromagnets or flash any of the bulbs but will flash indicator light L-3 which is visible on the control panel 22.

SW-3 is located on the control panel and is a rotary two deck destination selector switch. SW-3 includes the wipers 156 and 162 wiper 156 is part of selection SW-3A and wiper 162 is part of section SW-3B. From the circuit, it will be appreciated that SW-3A selects one of the four destination indicating motivating bulbs located on the formica sheet of the slave unit. SW-3B selects one of the four corner motivation electromagnets located beneath the formica sheet. SW-3A and SW-3B are ganged to facilitate "one control operation" and to insure that the toy when activated, will move in the same direction as the corner motivating bulb that is lighted.

SW-4 is a toggle type of bulb disabling switch located in the control panel and effective to disable operation of the bulbs which are located on the formica sheet of the slave unit. When SW-4 is in the off position, although the toy will move to any one of the four corner electromagnets which have been selected by SW-3B, none of the motivating bulbs will be lighted. When SW-4 is in the on position, the reverse happens, that is, as the toy moves toward any one of the four corner electromagnets, the motivating bulb in the direction the toy is moving is lighted. Such motivating bulbs stay lighted as long as the toy is in motion from the center to the corner position and while the toy is in the corner position, and shut off when the toy starts from the corner position back to the center of the slave unit.

Switch SW-5 is a toggle type switch and is the master power switch for the equipment. It is located on the control panel 22 of the control unit 18 and turns the equipment including power supply indicating lamp L-1 on or off.

Switch SW-6 is a push button type of motivated stimulus reaction switch and is held by the child 10 being tested. Depressing the switch, if the tone has been presented, will cause one of the motivation operating electromagnets to move the toy and cause a destination indicator bulb corresponding with the energized electromagnet to light. Depressing this switch without a tone gives the subject no rewarding response of any kind. However, the depressing of this switch with or without a tone or stimulus flashes the reaction indicator lamp L-3 on the control panel 22 which is visible only to the tester 12 to indicate that the tester is operating the switch SW-6.

To eliminate the chance for the toy 60 to start for its corner destination and then be prematurely reset by return to the center of the slave unit before completing its cycle, a deenergization delay circuit is employed. Its operation is as follows: When SW-6 is depressed, rectified current from rectifier 78 and diode D-1 charges capacitors C-1 and C-2. In addition, current passes through R-1 into the coil of RL-3, a circuit having been established by closing the relay switch 88 to ground through resistor R-2. When SW-6 is released, the current stored in C-1 and C-2 is discharged through R-1 to the coil of RL-3. This delays or holds RL-3 in an activated position for approximately one to two seconds. As long as RL-3 is activated, RL-4 is activated by a grounded circuit through relay closed switches 120 and 126 and any one of the four corner motivation operating electromagnets selected by switch SW-3B is energized through selector switch element 162 connected to contact 160 engaged by relay closed switch 152.

With this delay circuit, no matter how quickly SW-6 is depressed and released, the toy travels to the corner position smoothly. If SW-6 is depressed and then immediately released, the toy will move to one of the four corner positions, stay there about one to two seconds, and then return automatically to the center of the slave unit. If, however, SW-6 is depressed and held down, the toy will move to the corner position and stay there until SW-6 is released or until the tone interrupter switch is released. When the interrupter switch is released, the toy will stay in the corner position about one to two seconds and then return to the center of the slave unit regardless of whether SW-6 is depressed.

It is contemplated that 28 volts at two and one-half amperes be switched to any one of the five electromagnets for the purpose of attracting the toy 60. However, such voltage and current will destroy the electromagnets if allowed to flow continuously. Since the current flows in any one of the corner electromagnets for a short duration of time the voltage and current present no problem. However, since current is continuously flowing in the center resetting electromagnet device 42 through normally closed relay switch 152, when said current is not flowing in any one of the corner electromagnets, and since current flows as long as the test lasts, which may be one-half an hour or more, it is necessary to reduce the voltage and current to a level which the center electromagnet will tolerate for a period of one-half hour or more. Accordingly, delayed power reducing means has been incorporated with power reducing relay coil RL-5 which operates as follows to reduce the energizing power for electromagnet 42 necessary to displace the toy for return to the center position: When RL-3 operates and is in the activated position, 28 volts D.C. are applied to C-4 through closed relay switch 122 and across R-3 to supply relay energizing current to the relay coil RL-5 so that closing of switch 106 shorts out resistor R-4 enabling displacing current to flow in the electromagnet 42. When RL-3 is deactivated by releasing SW-6 or the tone interrupter switch, the current which had been stored in C-4 is discharged through R-3 to the coil of RL-5. This delays deenergization of RL-5 for approximately one to two seconds after RL-3 has been deactivated to insure return of the toy to center position. When in the deactivated position, movable contact 102 of RL-5 is opened so that resistor R-4 is in series with the coil of the center electromagnet 42. This resistor reduces the power from 28 volts at two and one-half amperes to about 12 volts at one and a quarter amperes which the electromagnet will tolerate for long periods of time and is sufficient to hold the toy in the center position to which it has already returned.

While in the activated position, contactor 102 of coil RL-5 switches R-4 out of series with the coil of the center electromagnet. With R-4 out of the circuit, 28 volts at two and one-half amperes is switched back to the center electromagnet 42 for the purpose of attracting the toy back to the center of the slave unit. As the toy reaches the center, RL-5 is again deactivated; the movable contact 102 of RL-5 again switches R-4 back in series with the coil of the center electromagnet 42, and again the voltage and the current are reduced from 28 volts at two and one-half amperes to about 12 volts at one and a quarter amperes.

In order for the tester to know every time that reaction switch SW-6 is depressed regardless of tone presentation, a special circuit is incorporated. Its operation is as follows: If SW-6 were to be depressed without a tone presentation, nothing happens, the toy 60 does not respond to the activation of SW-6. This will be realized when the circuit is carefully considered. Voltage to energize the coil of RL-3 is switched by SW-6 through terminal 15 which causes L-3 to light and C-1 and C-2 to be charged. The flashing of L-3 on the control panel indicates this response to the tester. Current also passes through the rectifier D-1 into capacitors C-1 and C-2. The capacitors store some of the circuit. The voltage also appears at R-1 and the coil of RL-3. Further, voltage appears at terminal 16 and movable contact 88 of motivation removal relay RL-2. Since RL-2 is not energized, an open circuit is here presented and the current path is broken, and accordingly RL-3 cannot be energized at this time. Normally the current stored in C-1 and C-2 seeks ground potential through the filament of L-3. However, such current flow is blocked by the diode D-1. At this time condensers C-1 and C-2 are charged. If the tone were to be presented now, the toy would operate without the patient operating SW-6. This of course is not desirable and therefore the charged condensers C-1 and C-2 are discharged to ground through terminal 4. The current follows this path to movable contact 86 of coil RL-2 which is switched in series with resistor R-2 which is in series with ground. As the current from C-1 and C-2 reach this resistor, the current is directed to the point of ground and C-1 and C-2 are discharged. With these condensers discharged, the presentation of the tone will not operate the toy by itself.

If SW-6 were to be depressed with a tone presentation, the toy operates, the motivating bulb operates, and the subject is rewarded. This operation is as follows: Current to energize the coil of RL-3 is carried to terminal 15 by way of SW-6. On its way to the coil of RL-3, some of the current passes through L-3 which then lights up on the control panel and indicates the response to the tester. In addition, some of the current passes through the diode D-1 into condensers C-1 and C-2. These condensers store some of the current. The current continues to pass through R-1 and to the coil of RL-3. The current passes through the coil of RL-3 and terminal 16 to movable contact 88 of RL-2. Since the tone is being presented, RL-2 is energized. Therefore, contactor 88 is switched to ground potential at stationary contact 92 of RL-2 and the current carried to it by terminal 16 is directed to ground. Current therefore flows through RL-3 therefore energizing RL-3. Capacitors C-1 and C-2 will not be discharged through R-2 since movable contact 86 of RL-2 is in the open position. Although the current source is stopped by releasing SW-6, the current which has been stored in capacitors C-1 and C-2 is discharged through R-1 and through the coil of RL-3. This current passes through terminal 16 to contact 88 of RL-2 to ground, and in so doing delays or holds RL-3 in an activated position for about one to two seconds as aforementioned to delay deenergization of the displacing electromagnets, the time it takes for C-1 and C-2 to discharge. If SW-6 were held depressed, but the tone interrupter switch on the audiometer were released, that is the tone ceased, the current flowing in the coil of RL-3 is immediately stopped as contact 88 of RL-2 moves to the open position. The current stored in capacitors C-1 and C-2 is carried by terminal 4 to contact 86 of RL-2 to R-2 where it is directed to ground. This clears the circuit so that if the tone were to be again presented, the toy would not move but would be ready to move at the command from the subject when he depresses SW-6. The foregoing circuit arrangement involving the control exercised by the motivation removal relay RL-2, thus constitutes an operational reset means to render the slave unit 20 immediately operative when the test equipment is in operation.

From the foregoing, the structure, circuitry and operation of the invention should be apparent. In summary, one of the toys is placed near the center of the formica top, the child 10 is instructed verbally or by pantomime to depress a small hand held switch SW-6 when he hears the tone. If the tone has been presented, and the child indicates that he hears the tone stimulus by depressing the switch SW-6, the toy will be displaced immediately from the center of the slave unit to any one of the four corner destinations which has been selected by switch SW-3. If the tone presentation is ceased by the tester, that is the interrupter switch on the audiometer is released, or the hand held switch SW-6 is released by the child 10, the toy moves automatically back to the center position from any one of the four corners by operation of the resetting device 42 under control of the power reducing relay switch 102. If the child depresses the switch without the tone or stimulus presentation, nothing happens to reward him; the toy does not move because of the deenergization of motivation relay RL-2 and closing of the circuit clearing reset switch 86. On the control panel, however, an indicator light L-3 is flashed, visible only to the tester 12, which indicates to him that SW-6 has been depressed between tone presentations. L-3 indicates to the tester whether the child is depressing the switch at random, and if he is depressing the switch between tone presentations. This indicator is necessary, for without it, the tester could not be sure when to present the tone. For instance, if there were no way to check whether the switch SW-6 were depressed, the tester might present the tone which would render the slave unit ready for operation. With SW-6 depressed, the toy would operate, the reward would be given, and the tester would have no more control over the test situation than he does with the marbles previously mentioned. In order for L-3 to be flashed, so as to permit the tester to check on the subject's response, the previously mentioned circuit is employed. L-3 flashes everytime SW-6 or SW-2 is depressed regardless of tone presentation.

The duel or over-control system involving over-control switch SW-1 and over-control switch SW-2 also makes it possible for the tester 12 to manipulate the toy 60 from the operator's position in instances where this is necessary. A dual control system is necessary to maintain the established conditioning. An illustration of the purpose and how the dual control system operates may help clarify this point. For example, if the toy should stop between the center and one of the four corners, the tester, without leaving the operating position, can reposition the toy to the center of the slave unit by merely depressing SW-1 and SW-2 simultaneously and then releasing. This is quick and the child's attention is not diverted. Without such a system, the tester would either have to get up and reach across the audiometer and reposition the toy, or give a tone to the child (a tone not be used for evaluation) and request that he depress SW-6. Such action is time consuming (this is important when testing young children) and such action causes the child's attention to be diverted from the test situation. Any time lost is detrimental and it might be necessary to recondition the child to the tone again. If this stage were ever reached, both the tester and the child would be fatigued; the test for that child for that day might be lost.

While this instrument was particularly designed to work in conjunction with a conventional pure tone audiometer, and to be used when testing the hearing of young children, since this instrument can be operated independently of an audiometer by depressing SW-1, it is apparent that said instrument can be employed to motivate children in instances other than just when testing hearing. For example, it might be used as a motivational device which affords a reward to a young child who is receiving speech therapy. More particularly, the child, upon uttering the correct phoneme or particular test syllable or word, could be rewarded by depressing SW-6. Thus, the invention is not necessarily restricted to the motivation of children during hearing tests only, that is, said instrument definitely possesses motivational potential in many situations where children's interests are to be captivated and retained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Audiometry equipment for facilitating evaluation of a person's hearing ability comprising in combination with a pure tone audiometer, a slave unit and a control unit and means operatively connecting said units to one another, said control unit including means for simultaneously activating said audiometer to emit a tone and activating said slave unit to enable it to respond to closure of a slave unit switch by performing certain predetermined operations, said certain predetermined operations including energization of electromagnetic means carried by said slave unit, said means included in said control unit being manually actuatable and adapted to be actuated by a person evaluating said patient's hearing ability.

2. Audiometry equipment for facilitating evaluation of a person's hearing ability comprising in combination with a pure tone audiometer, a slave unit and a control unit and means operatively connecting said units to one another, said control unit including means for simultaneously activating said audiometer to emit a tone and activating said slave unit to enable it to respond to closure of a slave unit switch by performing certain predetermined operations, said certain predetermined operations including energization of electromagnetic means carried by said slave unit, and means in said control unit responsive to closure of said slave unit switch when said slave unit switch is closed not in response to said tone stimulus.

3. Audiometry equipment for facilitating evaluation of a person's hearing ability comprising in combination with a pure tone audiometer, a slave unit and a control unit and means operatively connecting said units to one another, said control unit including means for simultaneously activating said audiometer to emit a tone and activating said slave unit to enable it to respond to closure of a slave unit switch by performing certain predetermined operations, said slave unit switch being normally open and adapted to be manually closed by a patient in response to a tone stimulus, said means included in said control unit being manually actuatable and adapted to be actuated by a person evaluating said patient's hearing ability, further means in said control unit responsive to closure of said slave unit switch when said slave unit switch is closed not in response to said tone stimulus, and signal means in said control unit responsive to closure of said slave unit switch when said slave unit switch is closed not in response to said tone stimulus, said certain predetermined operations including energization of electromagnetic means carried by said slave unit.

4. The combination of claim 3 wherein said slave unit includes a housing having a panel closing the top thereof, said electromagnetic means disposed in said housing, and magnets on said panel movable in response to energization of said electromagnetic means.

5. Testing equipment for children including means for motivating children during the testing interval comprising a stimulus creating device, a control unit connected to said device for initiating operation thereof, a slave unit, and means operatively connecting said units to one anotehr, said control unit including means for activating said slave unit simultaneously with the initiation of said device, and means enabling said slave unit when activated to respond to closure of a slave unit switch by performing certain predetermined operations, said slave unit switch being normally open and adapted to be manually closed by a patient in response to said stimulus, said means included in said control unit being manually actuatable and adapted to be actuated by a person testing said patient, further means in said control unit responsive to closure of said slave unit switch when said slave unit switch is closed not in response to said stimulus, said certain predetermined operations including energization of electromagnetic means carried by said slave unit.

6. Audiometry equipment for facilitating evaluation of a person's hearing ability comprising in combination with a pure tone audiometer, a slave unit and a control unit and means operatively connecting said units to one another, said control unit including means for simultaneously activating said audiometer to emit a tone and activating said slave unit to enable it to respond to closure of a slave unit switch by performing certain predetermined operations, said certain predetermined operations including energization of electromagnetic means carried by said slave unit, said slave unit including a housing having a panel closing the top thereof, said electromagnetic means being disposed in said housing, and a toy mounted on a magnet on said panel movable in response to energization of said electromagnetic means.

7. Apparatus for motivating response of a person to stimuli from a stimulus source comprising, movable display means automatically rendered operative only in response to stimuli from the stimulus source, reaction control means operatively connected to the movable display means and selectively actuated for enabling a person to render the movable display means rewardingly effective as a reaction to actual receipt of stimuli from said stimulus source, and motivation removal means operatively connected to the movable display means for instantaneously rendering the movable display means inoperative in the absence of stimuli from the stimulus source to discourage indiscriminate actuation of the reaction control means.

8. The combination of claim 7, wherein said movable display means comprises selected destination displacing means intermittently energized and deenergized under simultaneous control of the reaction control means and the stimulus source to displace an object, resetting means alternatively energized by the reaction control means and stimulus source for restoring said object to an initial position, and destination indicating means simultaneously energized with the displacing means.

9. The combination of claim 7, including delay means operatively connected to said movable display means to delay deenergization thereof when rendered ineffective by release of the reaction control means.

10. The combination of claim 7, including power reducing means operatively connected to the movable display means for reducing energization thereof when in an inoperative condition.

11. The combination of claim 7, including condition indicating means operatively connected to the stimulus source and reaction control means to indicate actuation of the reaction control means in the absence of stimuli from the stimulus source.

12. In combination with an audiometer generating a tone as a motivating stimulus in testing responsiveness of a person, response conditioning apparatus comprising, at least one movable toy, electrically powered means for moving said toy, switch means adapted to be actuated by the person in response to receipt of the motivating stimulus from the audiometer, reward establishing means operatively connecting the switch means to the audiometer and the electrically powered means for producing movement of the toy only upon actuation of the switch means while said tone is being generated by the audiometer, indicator means operatively connected to the switch for indicating actuation thereof when no tone is being generated by the audiometer, and selector means operatively connected to the electrically powered means for selectively varying the movement of the toy by the electrically powered means.

13. In combination with a stimulus source adapted to emit stimulating signals under control of an operator for testing response thereto of a subject, response motivating apparatus operatively connected to said stimulus source comprising, display means rendered operative only from an initial position to provide a rewarding experience for the subject, powered means operatively connected to said display means for rendering said display means operative until a terminal position thereof is attained, reaction control means adapted to be actuated by the subject as a response to said stimulating signals, means operatively connecting said reaction control means to the powered means and the stimulus source for rendering the display means operative in response to actuation of the reaction control only when stimulating signals are being emitted, and resetting means operatively connected to the powered means for restoring the display means to the initial position in the absence of stimulating signals or release of the reaction control means only after the terminal position is attained to thereby insure that each rewarding experience is complete.

14. The combination of claim 13, including indicating means operatively connected to the reaction control means for indicating to the operator actuation of the reaction control means when no stimulating signals are being emitted.

15. The combination of claim 14, including selector control means operatively connected to the powered means for directionally varying operation of the display means.

16. The combination of claim 13, including selector control means operatively connected to the powered means for directionally varying operation of the display means.

References Cited in the file of this patent

UNITED STATES PATENTS

| | | |
|---|---|---|
| 1,920,428 | Pank | Aug. 1, 1933 |
| 2,072,705 | Bloomheart | Mar. 2, 1937 |
| 2,678,692 | Ranseen | May 18, 1954 |
| 2,702,950 | Frederick | Mar. 1, 1955 |